(12) United States Patent
Kumagai et al.

(10) Patent No.: US 9,500,479 B2
(45) Date of Patent: Nov. 22, 2016

(54) SIMPLIFIED DISTANCE METER

(71) Applicant: Kabushiki Kaisha TOPCON, Itabashi-ku, Tokyo-to (JP)

(72) Inventors: Kaoru Kumagai, Tokyo-to (JP); Satoshi Yanobe, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 288 days.

(21) Appl. No.: 14/248,643

(22) Filed: Apr. 9, 2014

(65) Prior Publication Data

US 2014/0317944 A1 Oct. 30, 2014

(30) Foreign Application Priority Data

Apr. 24, 2013 (JP) .................................. 2013-091127

(51) Int. Cl.
*G01C 7/04* (2006.01)
*G01C 9/08* (2006.01)
*G01B 3/12* (2006.01)
*G01C 15/00* (2006.01)
*G01C 5/00* (2006.01)

(52) U.S. Cl.
CPC .................. *G01C 15/00* (2013.01); *G01B 3/12* (2013.01); *G01C 5/00* (2013.01); *G01C 7/04* (2013.01); *G01C 9/08* (2013.01)

(58) Field of Classification Search
CPC ................. G01C 7/04; G01C 9/08; G01B 3/12
USPC ................................... 33/533, 772, 773, 775
See application file for complete search history.

(56) References Cited

U.S. PATENT DOCUMENTS

| 4,788,773 A * | 12/1988 | Palsgard | G01C 9/08 |
| | | | 33/333 |
| 5,107,598 A | 4/1992 | Woznow et al. | |
| 6,035,542 A | 3/2000 | Woznow et al. | |
| 6,532,672 B1 * | 3/2003 | Gottlieb | G01B 5/26 |
| | | | 33/124 |
| 6,550,151 B2 * | 4/2003 | Airey | G01B 3/12 |
| | | | 33/1 H |
| 2004/0055171 A1 | 3/2004 | Toom | |

FOREIGN PATENT DOCUMENTS

| DE | 4115809 A1 | 11/1992 | |
| DE | 19508264 C1 | 2/1996 | |
| EP | 0053033 A1 | 6/1982 | |
| JP | 01187410 A * | 7/1989 | ............... G01C 7/04 |

(Continued)

OTHER PUBLICATIONS

European communication mailed Aug. 12, 2014 in corresponding European patent application No. 14162643.2.

(Continued)

*Primary Examiner* — R. A. Smith
(74) *Attorney, Agent, or Firm* — Nields, Lemack & Frame, LLC

(57) ABSTRACT

A simplified distance meter comprises a frame, at least two wheels installed in front and rear of the frame, rotation detectors for detecting rotation of at least one wheel, and tilt detecting means installed on the frame, wherein amount of rotations of the wheels is obtained by the rotation detector, and tilting of the frame corresponding to the amount of rotations is acquired by the tilt detecting means.

11 Claims, 5 Drawing Sheets

(56) References Cited

FOREIGN PATENT DOCUMENTS

JP        2004-294312 A    10/2004
JP         2013-29470 A     2/2013

OTHER PUBLICATIONS

Proceedings of the IEEE, vol. 63, No. 12, Dec. 1975, pp. 1692-1716, "Adaptive Noise Cancelling: Principles and Applications", Widrow, et al.
European communication, dated Dec. 15, 2015 in corresponding European patent application No. 14162643.2.

* cited by examiner $$L = \Sigma \frac{1}{2} D \cdot \theta_1$$

$$H = \Sigma \frac{1}{2} D \cdot \theta_1 \cdot \sin V_1$$

SIMPLIFIED DISTANCE METER

BACKGROUND OF THE INVENTION

The present invention relates to a simplified distance meter for measuring a distance and a relative height in easy and simple manner.

As a method generally used for as-built management or cross-sectional leveling in civil engineering work, surveying by using a total station is generally known.

In the surveying operation by using a total station, surveying can be accomplished with high accuracy. However, the total station must be installed at a position separated from a place to be surveyed, and this causes such problems as: restriction is caused by the place of installation, the time is required for the setting, or more working time is needed for the surveying operation. Further, there have been problems in that two or more operators must be assigned.

SUMMARY OF THE INVENTION

It is an object of the present invention to provide a simplified distance meter, by which it is possible to carry out surveying operation with no restriction on the place or the operation, and the surveying operation can be carried out in easy and simple manner.

To attain the object as described above, a simplified distance meter according to the present invention comprises a frame, at least two wheels installed in front and rear of the frame, rotation detectors for detecting rotation of at least one wheel, and tilt detecting means installed on the frame, wherein amount of rotations of the wheels is obtained by the rotation detector, and tilting of the frame corresponding to the amount of rotations is acquired by the tilt detecting means.

Further, the simplified distance meter according to the present invention further comprises a magnetic compass.

Further, the simplified distance meter according to the present invention further comprises an arithmetic control unit, wherein the arithmetic control unit calculates a locus of moving and a relative height based on the traveling distance measured according to detection results of the rotation detector and based on the result of detection by the tilt detecting means.

Further, in the simplified distance meter according to the present invention, the arithmetic control unit is installed on said frame.

Further, the simplified distance meter according to the present invention further comprises a terminal unit and the arithmetic control unit is installed on the terminal unit.

Further, in the simplified distance meter according to the present invention, the tilt detecting means has two types of tilt sensors, one of the two types of tilt sensors detects absolute horizontality, and the other detects deviation from the absolute horizontality detected by the other tilt sensor.

Further, in the simplified distance meter according to the present invention, the other tilt sensor is an acceleration sensor.

Further, in the simplified distance meter according to the present invention, out of an output signal from the acceleration sensor, a high frequency component is extracted and the component is processed by positive-negative reversion, and a signal obtained processed by positive-negative reversion is added to the output signal.

Further, in the simplified distance meter according to the present invention, there are provided at least two of the acceleration sensors, out of the output signal from one of the acceleration sensors, a signal is prepared by extracting high frequency component and by positive-negative reversion, the signals obtained by positive-negative reversion is added to an output signal from the other of the acceleration sensors, and a tilting of the frame is detected.

Furthermore, in the simplified distance meter according to the present invention, acceleration is calculated based on a signal from the rotation detector, and a result of detection by the acceleration sensor is corrected based on the acceleration.

According to the present invention, the simplified distance meter comprises a frame, at least two wheels installed in front and rear of the frame, rotation detectors for detecting rotation of at least one wheel, and tilt detecting means installed on the frame, wherein amount of rotations of the wheels is obtained by the rotation detector, and tilting of the frame corresponding to the amount of rotations is acquired by the tilt detecting means. As a result, distance measurement and tilting measurement of a running surface can be performed at the same time without restriction of the place and in easy manner.

Further, according to the present invention, the simplified distance meter further comprises a magnetic compass. As a result, it is possible to perform distance measurement in the direction as desired and tilting measurement on the running surface.

Further, according to the present invention, the simplified distance meter further comprises an arithmetic control unit, wherein the arithmetic control unit calculates a locus of moving and a relative height based on the traveling distance measured according to detection results of the rotation detector and based on the result of detection by the tilt detecting means. As a result, it is possible to carry out measurement of distance and relative height without using a costly device such as a total station and without being restricted on the place of measurement.

Further, according to the present invention, in the simplified distance meter, the tilt detecting means has two types of tilt sensors, one of the two types of tilt sensors detects absolute horizontality, and the other detects deviation from the absolute horizontality detected by the other tilt sensor. As a result, the measurement of tilting in wide range can be carried out with high reliability.

Further, according to the present invention, in the simplified distance meter, out of an output signal from the acceleration sensor, a high frequency component is extracted and the component is processed by positive-negative reversion, and a signal obtained processed by positive-negative reversion is added to the output signal. As a result, it is possible to eliminate the influence of vibration during the running from the measurement of tilting.

Further, according to the present invention, in the simplified distance meter, there are provided at least two of the acceleration sensors, out of the output signal from one of the acceleration sensors, a signal is prepared by extracting high frequency component and by positive-negative reversion, the signals obtained by positive-negative reversion is added to an output signal from the other of the acceleration sensors, and a tilting of the frame is detected. As a result, it is possible to eliminate the influence of vibration during running from the measurement of tilting.

Furthermore, according to the present invention, in the simplified distance meter, acceleration is calculated based on a signal from the rotation detector, and a result of detection by the acceleration sensor is corrected based on the acceleration. As a result, it is possible to eliminate the influence of acceleration generated at the starting and at the stopping of the running of the simplified distance meter from the measurement of tilting.

DETAILED DESCRIPTION OF THE PREFERRED EMBODIMENTS

Figure 1:
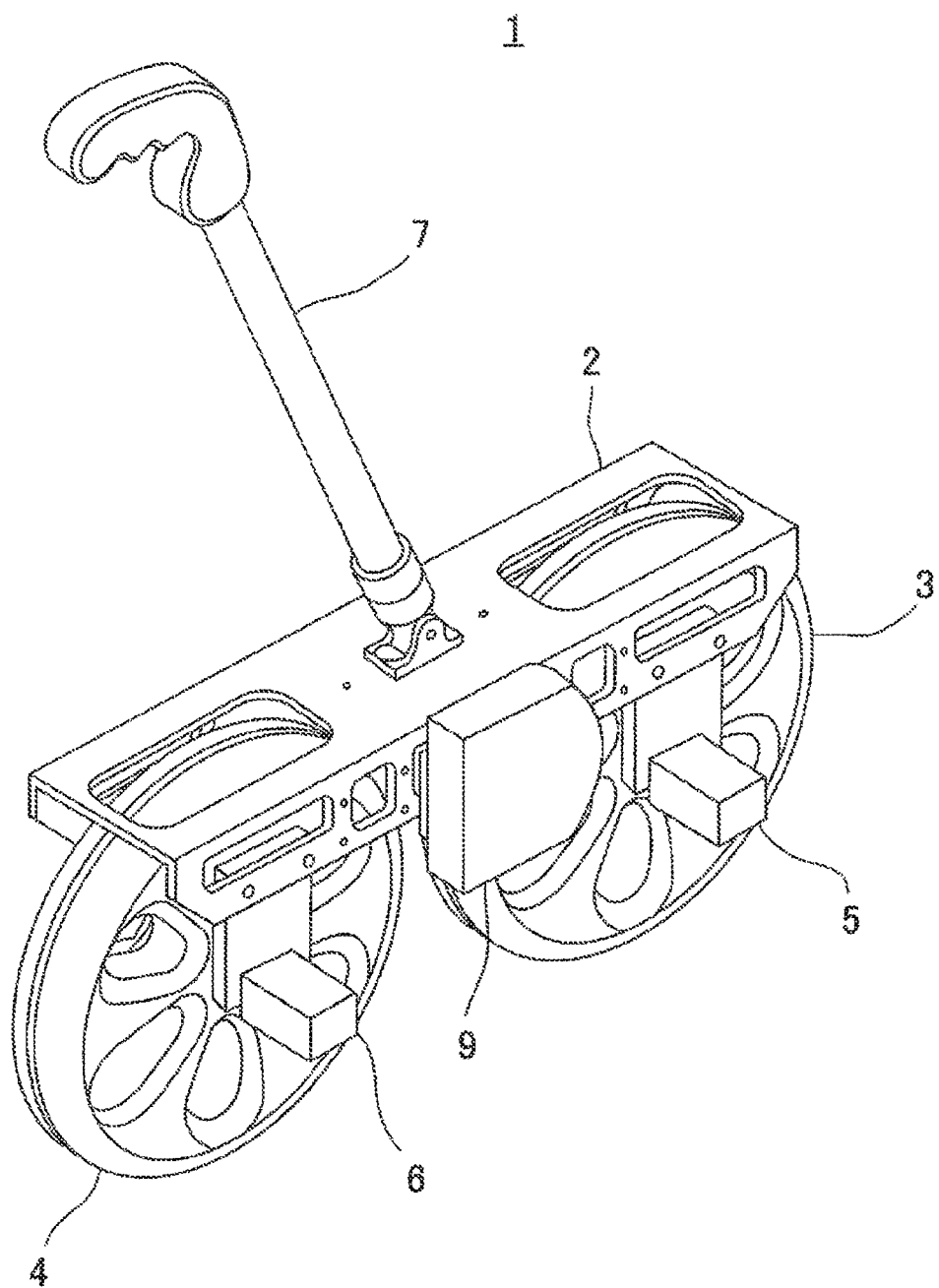
FIG. 1 is a perspective view of a simplified distance meter according to an embodiment of the present invention.

By referring to the drawings, description will be given below on an embodiment of the present invention.

Referring to FIG. 1, description will be given below on a simplified distance meter 1 according to an embodiment of the present invention.

A frontal running wheel 3 and a rear running wheel 4 are installed on a frame 2 at each of front and rear positions respectively. The frontal running wheel 3 is supported on the frame 2 via a rotation shaft integrally rotating with the frontal running wheel 3. The rear running wheel 4 is supported on the frame 2 via a rotation shaft integrally rotating with the rear running wheel 4. The frontal running wheel 3 and the rear running wheel 4 have the same diameter, and a value of diameter is already known.

A frontal encoder 5 as a rotation detector is provided on a rotation shaft of the frontal running wheel 3, and rotation of the frontal running wheel 3 is detected by the frontal encoder 5. On a rotation shaft of the rear running wheel 4, a rear encoder 6 as a rotation detector is provided and rotation of the rear running wheel 4 is detected by the rear encoder 6. It may also be so arranged that one of either the frontal encoder 5 or the rear encoder 6 is provided.

On an upper surface of the frame 2, a hand-pushing rod 7 in installed so that the hand-pushing rod 7 can be freely moved only in advancing direction. Also, on a lateral surface of the frame 2, a data processing device 8 (to be described later) is installed.

Figure 2:
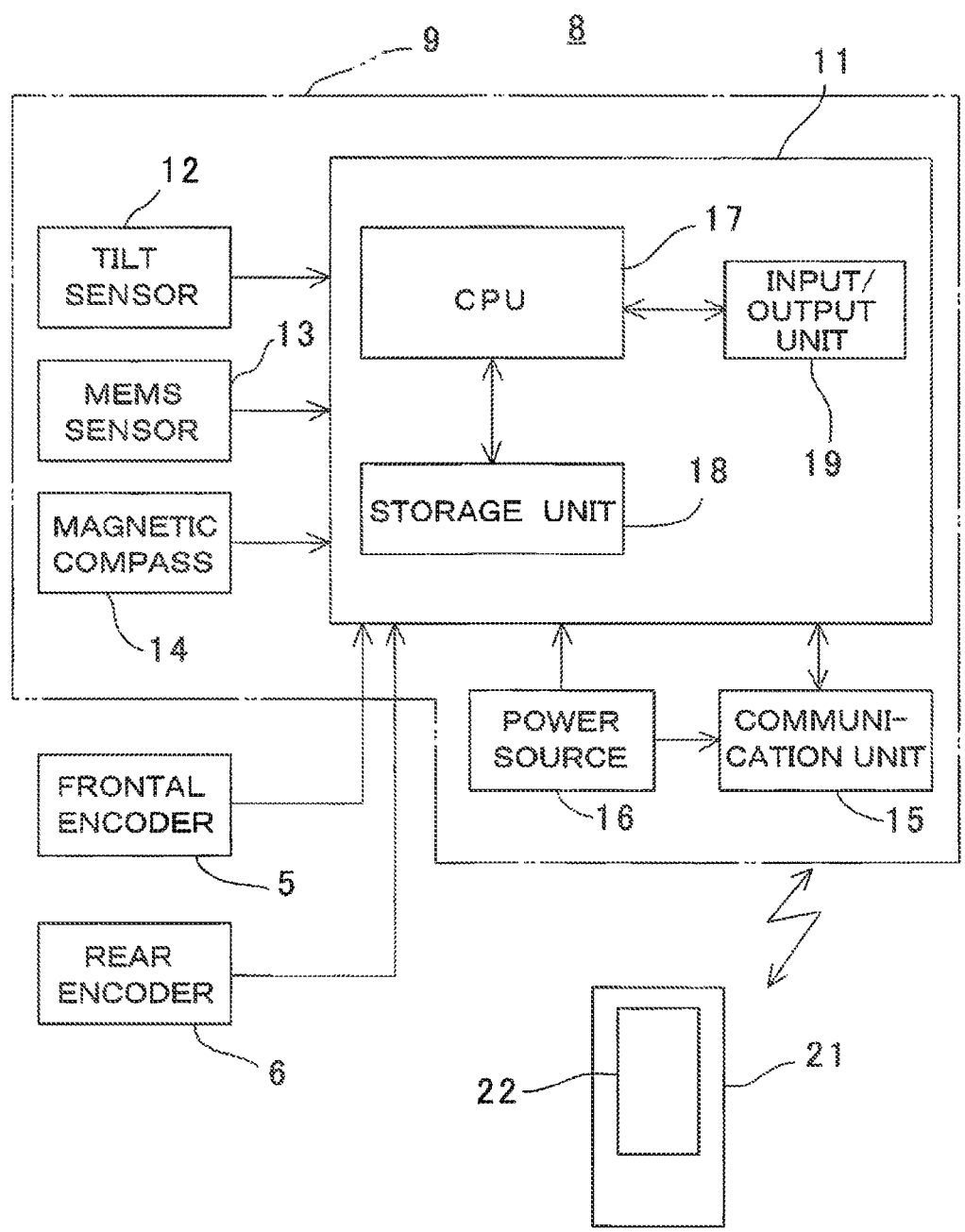
FIG. 2 is a schematical block diagram of a data processing device to be used in the simplified distance meter.

By referring to FIG. 2, description will be given below on the data processing device 8.

The data processing device 8 is designed in a water-proof structure, and an arithmetic control unit 11, a tilt sensor 12, an acceleration sensor 13, a magnetic compass 14, a communication unit (communication module) 15, a power source 16, etc. are accommodated in a unit case 9 of water-proof structure. Further, the arithmetic control unit 11 comprises an arithmetic unit represented by a CPU (central processing unit), a storage unit 18, an input/output unit 19, etc.

The tilt sensor 12 and the acceleration sensor 13 make up together tilt detecting means. The tilt sensor 12 detects absolute horizontality with high accuracy. The acceleration sensor 13 is a MEMS sensor, for instance, and detects relative tilting with respect to a horizontal line detected by the tilt sensor 12. The acceleration sensor (hereinafter referred as "MEMS sensor") 13 can detect tilting in three axial directions, and the MEMS sensor 13 can detect tilting at higher responding speed and in wider range than the tilt sensor 12.

The results detected by the tilt sensor 12, the MEMS sensor 13, and the magnetic compass 14 are associated with amount of rotation detected by the frontal encoder 5 and the rear encoder 6 and are inputted to the arithmetic control unit 11.

The communication unit 15 sends an acquired data and a result of calculation to a terminal unit 21 having a display unit 22 via wireless communication to PDA, PC, etc., for instance. A cellular phone available in the market may be used as the terminal unit 21.

In the storage unit 18, a calculation program, a communication control program, an input/output control program, etc. are stored. The arithmetic unit 17 carries out various types of calculation processing and data processing by operating the program, and transmits the data to the terminal unit 21

The power source 16 supplies electric power as necessary to the arithmetic control unit 11 and the communication unit 15. As the power source 16, a rechargeable battery or a replaceable battery may be used.

A rotation angle of the frontal running wheel 3 (i.e. information relating to rotation of the frontal running wheel 3) as detected by the frontal encoder 5, and rotation angle of the rear running wheel 4 as detected by the rear encoder 6 (i.e. information relating to the rear running wheel 4) are inputted respectively to the arithmetic control unit 11.

Description will be given below on operation of a simplified distance meter 1 according to the present embodiment.

When the simplified distance meter 1 is driven, the frontal running wheel 3 and the rear running wheel 4 are rotated. Amount of rotation is detected by the frontal encoder 5 and the rear encoder 6 respectively, and the results of detection are inputted to the arithmetic control unit 11.

Based on the results of detection by the encoders 5 and 6, the arithmetic control unit 11 calculates amount of rotation of the frontal running wheel 3 and the rear running wheel, and also calculates a distance of traveling from the amount of rotation obtained and from diameter of each of the wheels. Further, from detection results of the tilt sensor 12, it is judged whether traveling has been performed on a horizontal plane or on a tilted plane. The arithmetic control unit 11 calculates relative height based on the results of detection by the encoders 5 and 6 and on the results of detection by the tilt sensor 12.

In a case where the traveling is under the condition where the tilt sensor 12 detects horizontality, the distance of traveling is a distance of horizontal traveling. If the traveling is under the condition where the tilt sensor 12 has detected the tilting, the traveling means traveling on a tilted surface. From the tilt angle detected by the tilt sensor 12 and from traveling distance of the simplified distance meter 1, a distance of traveling in horizontal direction and a change of height during the traveling can be obtained. Further, from the data after the surveying, a locus of the simplified distance meter 1 and a relative height can be obtained during the surveying operation.

Therefore, by traveling the simplified distance meter 1 between two points to be measured or by traveling the simplified distance meter 1 along the line to be measured, a distance and a relative height can be measured.

Further, there is a case where a tilt angle to be detected by the tilt sensor 12 is changed at the same time in traveling. For instance, in a case where cross-sectional leveling is performed on a road, a road surface is higher at the center of the road because it is convenient if it is tilted in downward direction to drain water toward road side. For this reason, in a case where cross-sectional leveling is performed by using the simplified distance meter 1, the tilt sensor 12 detects a tilting at the start of the measurement, and the tilting to be detected is gradually decreased. Further, the tilt sensor 12 detects a horizontal position at the center of the road, and detects the tilting in reverse direction on the road surface beyond the center of the road.

Based on the results of detection from the frontal encoder 5 and the rear encoder 6, amount of traveling is calculated by micro-time unit. Further, by obtaining the tilt angle based on the results of detection from the tilt sensor 12, and by integrating the amount of horizontal traveling and the relative height which are obtained based on the amount of traveling and the tilt angle by micro-time unit, a horizontal traveling distance and a relative height on the tilted surface can be obtained. By calculating the amount of moving by micro-time unit, and by obtaining tilt angle based on the result detected from the tilt sensor 12, and further, by obtaining the change of relative height at real time, measurement can be made even when the surface to be measured is not a flat surface and even when it is a curved surface with surface irregularities.

In a case where the tilting of the simplified distance meter 1 exceeds detection range of the tilt sensor 12, the tilting is detected by the MEMS sensor 13. Because the tilting detected by the MEMS sensor 13 is based on highly accurate horizontality as detected by the tilt sensor 12, the accuracy and reliability of the MEMS sensor 13 is high.

Figure 3:
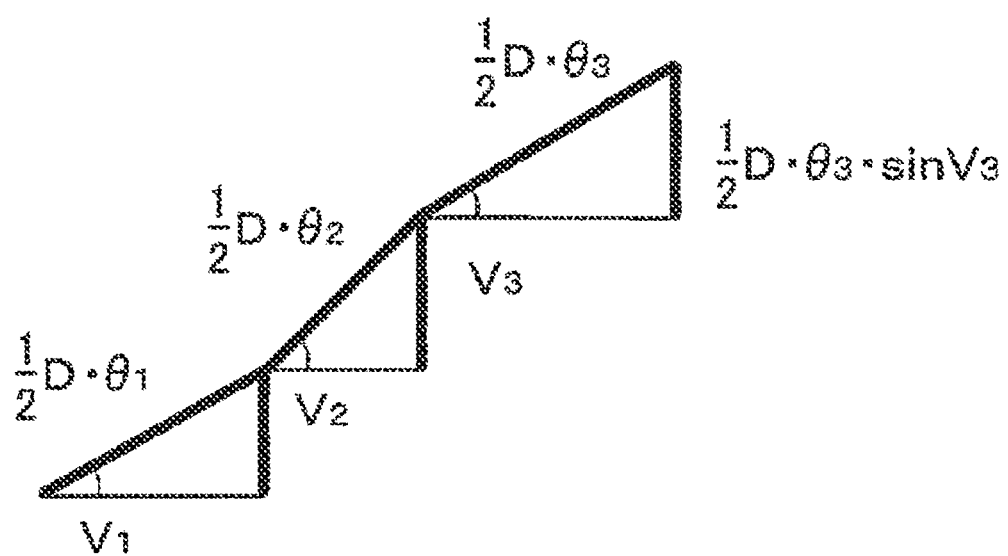
FIG. 3 is an explanatory drawing of a case where a relative height is determined by the simplified tilt distance meter.

FIG. 3 shows the measurement of relative height when the range finder is moved on a tilted plane.

In FIG. 3, reference letter D denotes a diameter of each of the frontal running wheel 3 and the rear running wheel 4. Further, reference letter θ denotes a rotation angle of each of the frontal running wheel 3 and the rear running wheel 4, and reference letter V denotes a tilt angle detected by the tilt sensor 12.

Traveling distance L of the simplified distance meter 1 is represented by $\Sigma$ (D$\theta$/2) and relative height H is represented by $\Sigma$ (D$\theta$ sin V/2).

A traveling distance and a relative height as calculated (measured) by the arithmetic control unit 11 are transmitted to the terminal unit 21 via the communication unit 15 and are displayed on the display unit 22.

Next, the arithmetic control unit 11 is always calculating deviation between signals of the frontal encoder 5 and the rear encoder 6. In case deviation occurs between the frontal encoder 5 and the rear encoder 6, it means that one of the wheels is separated from the running surface, or one of the wheels has slipped, or normal rotation of one of the wheels has been hindered by an obstacle. In such case, reliability of the traveling distance calculated according to the results of detection by the frontal encoder 5 and the rear encoder 6 is decreased. Therefore, in such case, a generation of rotational deviation between two wheels is transmitted to the terminal unit 21 and is displayed on the display unit 22. Based on the result displayed on the display unit 22, operator can judge whether the measurement should be continued or re-measurement should be made.

It may be so arranged that an allowance value is set on the arithmetic control unit 11 in advance and that the arithmetic control unit issues a warning that re-measurement should be made in a case where the deviation exceeds the allowable value.

Also, it is possible to monitor the advancing direction based on the result of detection by the magnetic compass 14. When the simplified distance meter 1 travels in meandering, such meandering can be corrected according to the result of detection by the magnetic compass 14.

Also, in a case where a measuring line is set up at an azimuth as predetermined, the detection result of the magnetic compass 14 (i.e. advancing direction of the simplified distance meter 1) is transmitted to the terminal unit 21 and is displayed on the display unit 2. Then, operator can move the simplified distance meter 1 to the azimuth as set.

In the above, the arithmetic control unit 11 is mounted on the simplified distance meter 1, while it may be so arranged that the function of the arithmetic control unit 11 may be given to the terminal unit 21. In this case, the results of detection by the tilt sensor 12, the MEMS sensor 13, the magnetic compass 14, the frontal encoder 5 and the rear encoder 6 are transmitted to the terminal unit 21 via the communication unit 15, and a traveling distance of the simplified distance meter 1, a traveling locus, and a relative height may be calculated at the terminal unit 21.

Next, it should be noted that the ground surface to be measured is not always smooth. Therefore, the simplified distance meter 1 should be vibrated by traveling. Because vibration gives action, as acceleration, on the tilt sensor 12 and the MEMS sensor 13, the vibration may exert influence on the result of detection of the tilting. Also, an acceleration gives action when the simplified distance meter 1 is moved or stopped, and the acceleration at the time of moving and stopping may exert influence on the results of detection of the tilting.

Description will be given on elimination of the influence by acceleration during vibration while running or when the moving is stopped.

First, description will be given on vibration while running.

Two types of the MEMS sensors 13 are provided: one for detection of tilting and one for eliminating vibration. It is so arranged that the two MEMS sensors 13 are installed at positions as close as possible to each other, or preferably, by integrating with each other so that the vibrations detected will be equal or equivalent to each other.

Figure 4A:
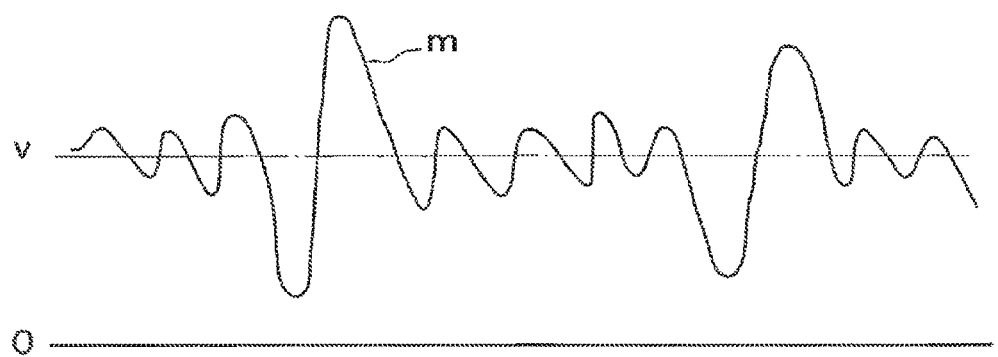
FIGS. 4A-B are explanatory drawings of a case where vibration components are removed from signals received from an acceleration sensor.

In FIG. 4A, a curve "m" represents a signal outputted from the MEMS sensor 13 for detection of tilting. In the figure, reference symbol 0 represents an output when horizontality is detected, and reference signal "v" on the level (represented by one-point chain line in the figure) is a signal corresponding to the tilting.

When the simplified distance meter 1 is traveled, tilting of running surface is not changed suddenly, and the change of signal level to match the change of tilting of the running surface is very low. Also, the change is also very slow and gentle. Therefore, within the predetermined time, e.g. in the unit of several seconds, there is almost neither the change of signal level nor vibration corresponding to the tilting of the running surface, and it would cause almost no problem even when the signal corresponding to the tilting of the running surface is regarded as direct current component as shown in the figure.

Therefore, there would be almost no problem to consider that almost of all vibratory waveforms as seen during the running are the vibrations caused by traveling (hereinafter, this is referred as high frequency vibration in comparison with signals for detection of tilting).

Figure 4B:
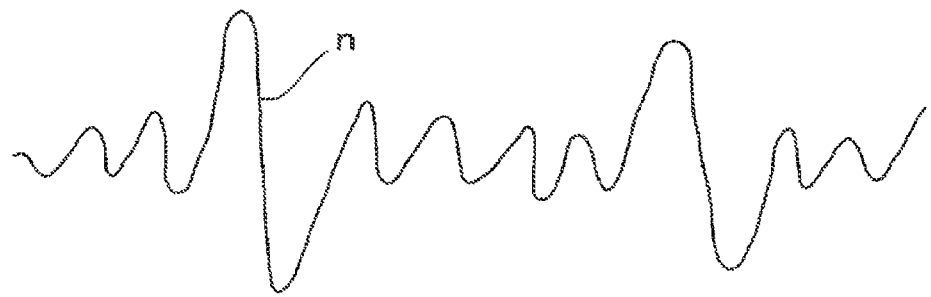

Next, a signal (m) similar to a signal of the MEMS sensors 13 for detecting the tilting is outputted from the MEMS sensor 13 for eliminating vibration. The signals of these two MEMS sensors 13 and 13 are inputted to the arithmetic control unit 11. At the arithmetic control unit 11, only high frequency components are extracted from the MEMS sensors 13 for excluding vibration, and a signal "n" with upper and lower parts inverted ("+" and "−" inverted) is prepared. This signal "n" is represented by a curve "n" in FIG. 4B.

By summing up the single "n" with the signal "m", high frequency components are set off each other, and only the signals "v" to detect the tilting can be obtained.

It may be so arranged that the MEMS sensor 13 for eliminating vibration is omitted and only the signals with high frequency components from the MEMS sensor 13 for detecting the tilting are acquired. Then, by reversing positive and negative in the high frequency components, and, the signals after positive-negative reversing may be added to the original signals, i.e. to the signals outputted by the MEMS sensor 13 for the detection of the tilting.

Next, description will be given on eliminating the influence by acceleration at the time of moving or stopping.

Rotation angles of the frontal running wheel 3 and the rear running wheel 4 are detected by the frontal encoder 5 and the rear encoder 6 respectively, and the results of detection are continuously inputted to the arithmetic control unit 11.

The arithmetic control unit 11 differentiates the detection results of at least one of the frontal encoder 5 and the rear encoder 6, and acceleration (ratio of the change of number of rotations) is calculated. In a case where the acceleration thus calculated is higher than a predetermined value, a tilt angle detected by the acceleration sensor 13 is amended based on the calculated acceleration.

Figure 5:
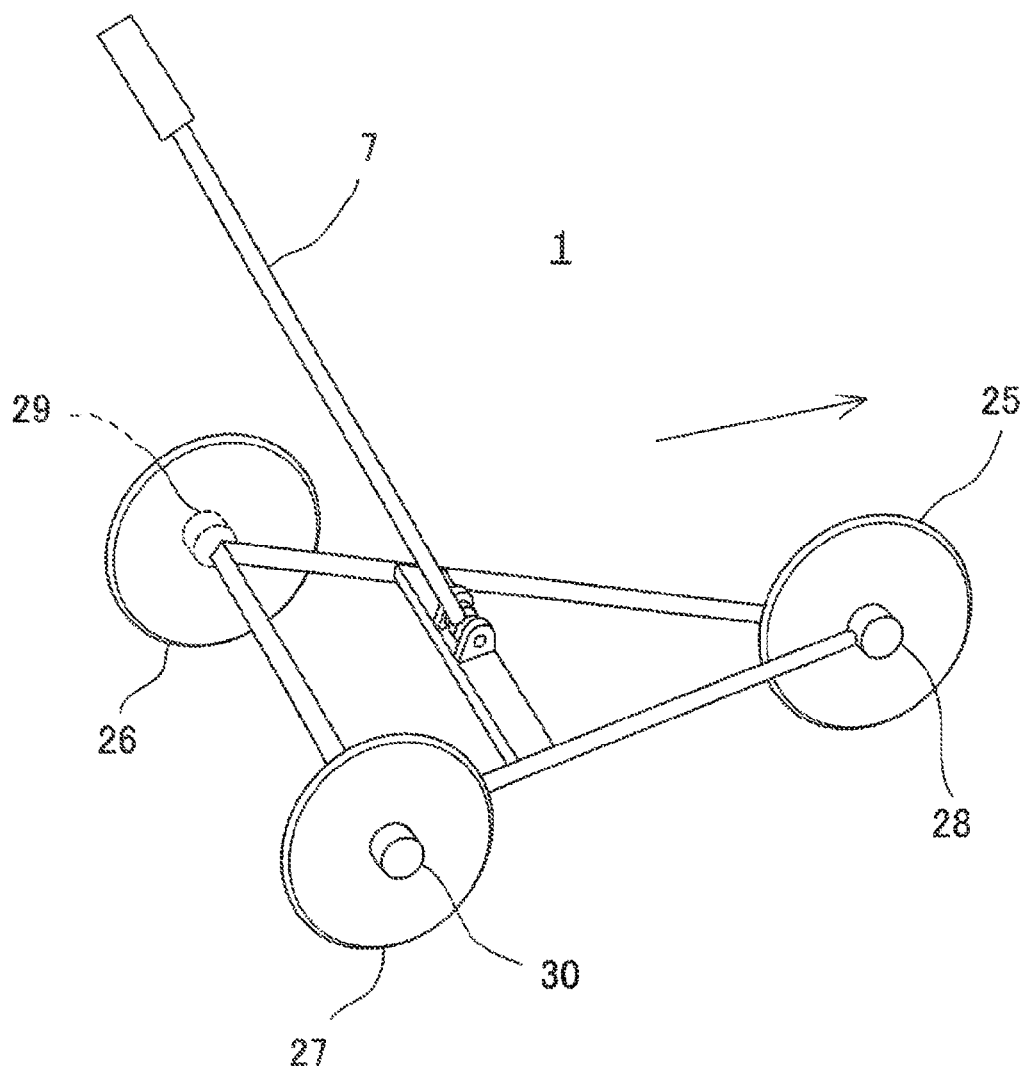
FIG. 5 is a schematical perspective view of a simplified distance meter according to another embodiment of the present invention in a case where the simplified distance meter is a three-wheel roller.

FIG. 5 shows another embodiment of the invention. In this another embodiment, a simplified distance meter 1 is designed as a three-wheel roller having a front wheel 25, a left wheel 26 and a right wheel 27. Each of the wheels 25, 26 and 27 is designed to be rotatable independently from each other. Encoders 28, 29 and 30 are mounted respectively on each of the rotation shafts of the wheels 25, 26 and 27, and number of rotations of each of the wheels 25, 26 and 27 is separately detected by the encoders 28, 29 and 30 respectively.

By individually detecting the number of rotations of each of the left wheel 26 and the right wheel 27 by the encoders 29 and 30 respectively, conditions of direction change can be detected from the difference between inner and outer wheels when the simplified distance meter 1 changes direction. Further, by comparing the azimuth detected by the magnetic compass 14 with the difference between inner and outer wheels, reliability of the detecting condition of the direction change is improved.

Even in a case where one of the left wheel 26 or the right wheel 27 is separated from ground surface due to leaping or bounding, the distance measurement can be carried out with higher accuracy by continuously monitoring signals from the encoders 29 and 30, by comparing output signals from the encoders 29 and 30, and by acquiring signals from the encoders, which are judged as being in contact with ground surface.

The invention claimed is:

1. A simplified distance meter, comprising a frame, at least two wheels installed in front and rear of said frame, rotation detectors for detecting rotation of at least one wheel of said two wheels, and tilt detecting means installed on said frame, wherein amount of rotations of said at least one wheel is obtained by said rotation detector, and tilting of said frame corresponding to said amount of rotations is acquired by said tilt detecting means, and wherein said tilt detecting means comprises two tilt sensors, and is configured such that one of the two tilt sensors detects absolute horizontality, and the other has higher responding speed than said one tilt sensor, is capable of detecting tilting in wide range and detects deviation from the absolute horizontality detected by said one tilt sensor.

2. A simplified distance meter according to claim 1, further comprising a magnetic compass.

3. A simplified distance meter according to claim 1 or claim 2, further comprising an arithmetic control unit, wherein said arithmetic control unit calculates a locus of moving and a relative height based on the traveling distance measured according to detection results of said rotation detector and based on the result of detection by said tilt detecting means.

4. A simplified distance meter according to claim 3, wherein said arithmetic control unit is installed on said frame.

5. A simplified distance meter according to claim 3, further comprising a terminal unit and said arithmetic control unit is installed on said terminal unit.

6. A simplified distance meter according to claim 3, wherein said rotation detectors are provided at each of two wheels, respectively, and wherein said arithmetic control unit is arranged so as to calculate a rotational deviation between said two wheels based on the rotation detected by said rotation detectors.

7. A simplified distance meter according to claim 1, wherein said other tilt sensor is an acceleration sensor.

8. A simplified distance meter according to claim 7, wherein, out of an output signal from said acceleration sensor, a high frequency component is extracted and the component is processed by positive-negative reversion, and a signal obtained by said positive-negative reversion is added to said output signal.

9. A simplified distance meter according to claim 8, wherein there are provided at least two of said acceleration sensors, out of the output signal from one of said acceleration sensors, a signal is prepared by extracting high frequency component and by positive-negative reversion, the signals obtained by positive-negative reversion is added to an output signal from the other of said acceleration sensors, and a tilting of said frame is detected.

10. A simplified distance meter according to claim 8 or claim 9, wherein acceleration is calculated based on the signal from said rotation detector, and a result of detection by said acceleration sensor is corrected based on said acceleration.

11. A simplified distance meter according to claim 7, wherein acceleration is calculated based on a signal from said rotation detector, and a result of detection by said acceleration sensor is corrected based on said acceleration.

* * * * *